Sept. 8, 1953

J. M. EASTMAN 2,651,297

CONTROL FOR INTERNAL-COMBUSTION ENGINES

Filed July 8, 1947

INVENTOR
JAMES M. EASTMAN
BY
ATTORNEY

Sept. 8, 1953  J. M. EASTMAN  2,651,297
CONTROL FOR INTERNAL-COMBUSTION ENGINES
Filed July 8, 1947  2 Sheets-Sheet 2

INVENTOR
JAMES M. EASTMAN
BY
ATTORNEY

Patented Sept. 8, 1953

2,651,297

UNITED STATES PATENT OFFICE 2,651,297

CONTROL FOR INTERNAL-COMBUSTION ENGINES

James Middleton Eastman, South Bend, Ind., assignor to Bendix Aviation Corporation, South Bend, Ind., a corporation of Delaware Application July 8, 1947, Serial No. 759,547

6 Claims. (Cl. 123—119)

1

This invention relates to boost or power controls for internal combustion engines; it is particularly concerned with controls for engines having variable capacity supercharging systems employing fluid pressure means such as one or more fluid couplings for varying the ratio of engine-to-supercharger speed. In such systems, the charging pressure may be regulated by variably positioning the throttle, either manually or automatically, up to charging capacity for wide open throttle, and by regulating the drive on the main and/or auxiliary stage super-charger, to maintain a predetermined minimum pressure drop across the throttle so as to maintain throttle control up to the maximum altitude (critical) for which the engine can deliver the selected charging pressure. Fluid, usually engine oil, may be metered to the fluid couplings by means such as a hydraulic regulator valve actuated in coordination with the pressure drop across the throttle valve.

To avoid hunting and surging in systems employing regulator valves responsive to some engine condition, as for example the pressure drop across the throttle, it has in many instances proved desirable to snub or slow down the response of the regulator. In doing this, however, the regulator was rendered too sluggish and failed to respond with sufficient promptness to the pilot's demands as transmitted by way of the power control lever or quadrant; and the primary object of the present invention is to overcome this difficulty.

Another and more specific object is to provide a boost or power control of the type specified incorporating a metering valve which responds to the drop across the carburetor or other charge forming device, and in conjunction therewith a device for accelerating the response of the valve.

The foregoing and other objects and advantages will be apparent in view of the following description taken in conjunction with the drawings, wherein.

2

Figure 1:
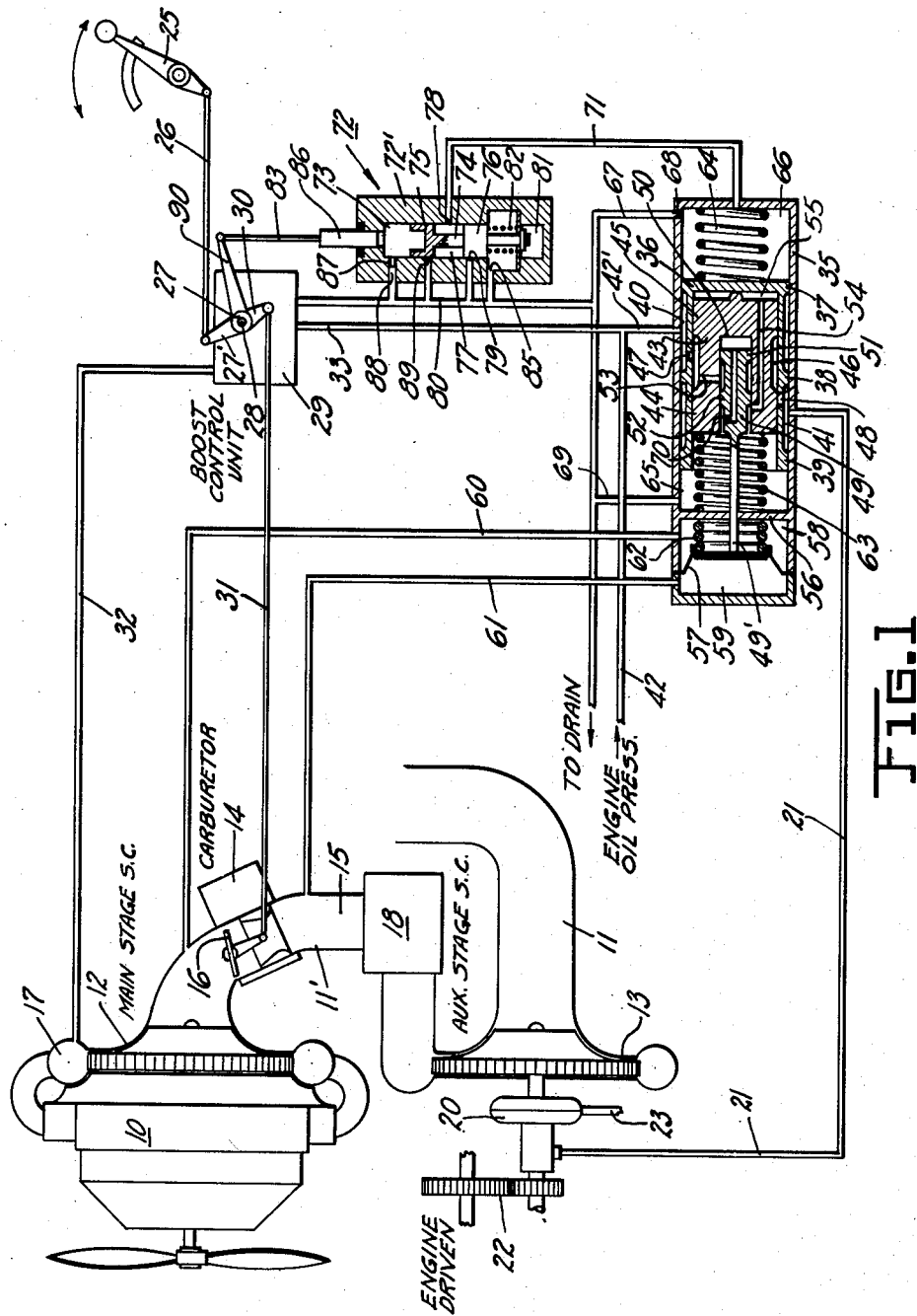
Figure 1 illustrates schematically an aircraft engine supercharging system embodying a control in accordance with the invention, the oil metering or regulator valve and coacting acceleration device being shown in section with the parts in the positions they normally occupy when the throttle is closed or only partially open.

Referring to the drawing, an aircraft engine is indicated at 10 having an air induction conduit 11, 11' which receives air from a conventional air scoop or like device, not shown. For the purpose of illustration, the air induction or input system is of the multi-stage type, including a supercharger 12, herein termed the "main stage" since it has a fixed gear ratio and supplies pressure under all conditions of operation, and a supercharger 13, herein termed the "auxiliary stage" since it is regulated to supplement the supercharger 12 under certain conditions of operation, as at wide open throttle when the capacity of the main stage supercharger is reached. A charge forming device such as a carburetor is shown at 14; it includes a venturi 15 and a throttle valve 16 for variably limiting the supply of air flowing to the intake manifold 17 and thence to the respective engine cylinders. An intercooler 18 is usually installed between stages to prevent excessive charge temperatures due to the rise across the supercharging system.

The drive on the auxiliary stage supercharger 13 is transmitted from the engine or other suitable power source through a variable speed hydraulic coupling 20. While only one coupling is shown, it will be obvious that two or more may be used to reduce slippage at higher supercharger speeds, to overdrive the main stage supercharger when needed, or to drive additional supercharger stages. Hydraulic couplings of this type are well known in the art and may be purchased as a complete unit in the open market. In general, each coupling consists of a driving rotor or impeller and a driven rotor or vaned runner mounted in a casing to which oil is supplied by way of a conduit 21. The drive from the engine may be through suitable transmission gearing 22. Oil under pressure fed to the rotor through conduit 21 reduces the slip between the driving and driven rotors, the amount of slip being in relation to oil fill which in turn varies with the feed of oil. This oil is thrown outwardly through bleeds formed in the rotors and is returned to the drain system by way of conduit 23.

The throttle 16 is controlled by means of a pilot's quadrant or power control lever 25 which connects by a link 26 with the one arm 27' of a bell crank lever 27 secured on the outer end of a shaft 28, the latter projecting into a boost control unit 29 which in turn connects with the throttle by means of an arm 30 and link 31. Since the boost control 29 may be of any preferred type and since, also, its particular construction forms no part of the present invention, it is not shown in detail. Actually, in certain installations a direct manual connection with the power lever may be used. Preferably, however, the boost control is of the type originally disclosed in the copending application of Frank C. Mock, Serial No. 440,669, filed April 27, 1942, now Patent 2,453,651, issued November 9, 1948, and also shown in the copending application of James M. Eastman et al. Serial No. 686,942, filed July 29, 1946, where it is operatively combined with a fluid coupling control for an auxiliary stage supercharging system. Briefly, when the pilot sets the power lever 25, he sets the datum for the desired manifold pressure, whereupon the boost control automatically positions the throttle to maintain the manifold pressure up to some predetermined altitude requiring a wide-open throttle. Below this altitude, as the throttle approaches wide-open, the pressure drop across the throttle decreases until a predetermined value, the metering valve starts flowing oil to the coupling, increasing the supercharge as needed to maintain this predetermined pressure drop. The manifold pressure connection for the boost control is indicated at 32. The conduit indicated at 33 is for conducting oil under pressure to the unit for operating the throttle hydraulic power pistons.

The fluid or oil pressure regulator for the hydraulic coupling, in the more or less simplified sectional schematic form shown for the purposes of illustration, comprises a cylindrical casing 35 in which a sleeve valve or coupling sleeve 36 is slidably mounted, the latter being provided with a series of peripheral lands 37, 38 and 39 defining therebetween an oil input or receiving chamber 40 and a metered oil discharge chamber 41. Oil from the engine pressure system is conducted to chamber 40 by way of conduit 42 and branch conduit 42', while metered oil is conducted from chamber 41 to the coupling 20 by way of conduit 21.

A coupling valve 43 is mounted for relative sliding movement in the sleeve valve 36, said valve 43 being formed with lands 44 and 45 between which is an annular chamber 46. Oil may flow to chamber 46 through one or more orifices 47 formed in the coupling sleeve 36, and oil may flow from said chamber to metered oil chamber 41 through one or more metering orifices 48 also formed in said sleeve.

A pilot valve 49 is mounted to slide within a longitudinal bore or chamber 50 formed in the piston valve 43; it is formed with a pair of lands 51 and 52 adapted to control oil ducts or passages 53 and 54 formed in the coupling valve 43 and by means of which oil under pressure may flow to a chamber 55 and produce relative sliding movement between the sleeve valve 36 and the piston valve 43. The pilot valve 49 has a stem 49' which slidingly projects through a partition wall 56 and is connected to a diaphragm 57, said diaphragm dividing the space between the partition wall 56 and the adjacent end of the casing 35 into a pair of air chambers 58 and 59, and these chambers are connected, respectively, to the air intake conduit 11' anterior and posterior the carburetor 14 and throttle 16 by means of conduits 60 and 61. A spring 62 is disposed in the chamber 58 and tends to maintain the pilot valve 49 in a position with the duct 53 connected to duct 54; and additional reset springs 63 and 64 are mounted in chambers 65 and 66 and function to determine the relative ratio of movement of the coupling valve 43 and the sleeve 36 when the latter are moved by hydraulic pressure in chamber 55, and to also reset these parts in a given metering position for a given drop across the carburetor subsequent to adjustment of the throttle. A drain connection 67 leads from the chamber 66 by way of a calibrated bleed 68; and another similar connection 69 leads from chamber 65 and prevents entrapment of oil in said latter chamber as well as in the chamber 50 which is vented to chamber 65 through the pilot valve 49 by way of duct 70.

A by-pass drain connection 71 leads from chamber 66 to an acceleration device generally indicated at 72 and comprising a valve body 72' formed with an elongated chamber 73 in which is slidingly mounted a piston valve 74 having a pair of lands 75 and 76 defining therebetween a chamber 77, said connection 71 communicating by way of a port 78 with chamber 77. From chamber 77 drain oil may escape to the drain system by way of port 79 or port 89 and conduit 80 when the land 76 or land 75 uncovers either of said ports. The lower end of the piston valve 74 terminates in a headed stem-shaped portion which projects into a chamber 81 and is encircled by a spring 82 which normally urges the piston valve toward a centered position with both ports 79 and 89 closed. Chamber 81 is vented to drain by way of port 85. A plunger or piston 86 is arranged to pressurize the oil in chamber 73 and thereby produce movement of valve 74 against the tension of spring 82, the rate of return movement of said latter valve being determined by a calibrated bleed 87 through which oil may escape from or enter chamber 73 via conduit 80 and port 88. The piston 86 connects by means of link 83 and arm 90 with the bell crank lever 27. Motion of lever 27 in either direction causes valve 74 to move temporarily from its centered position, venting conduit 71 to drain conduit 80 via chamber 77 and either port 79 or port 89.

*Operation*

In the position of the parts as shown in Figure 1 of the drawings, the throttle 16 is closed or nearly so, and it can be assumed that the engine is operating at a low or medium power output, for example, warming-up speed prior to take-off. Under these conditions, the differential across the diaphragm 57 will be close to maximum, or will be sufficient to hold spring 62 compressed and the pilot valve 49 open with the land 52 clear of the duct 54, so that oil has drained from chamber 55 and spring 64 has moved coupling sleeve 37 against the adjacent end of the coupling valve 43, thereby closing metering orifice 48. Since fluid or hydraulic flow to the coupling 20 is now closed off, the latter will be at maximum slip, and charging pressure will be supplied to the engine by supercharger 12 in relation to throttle position.

Figure 2:
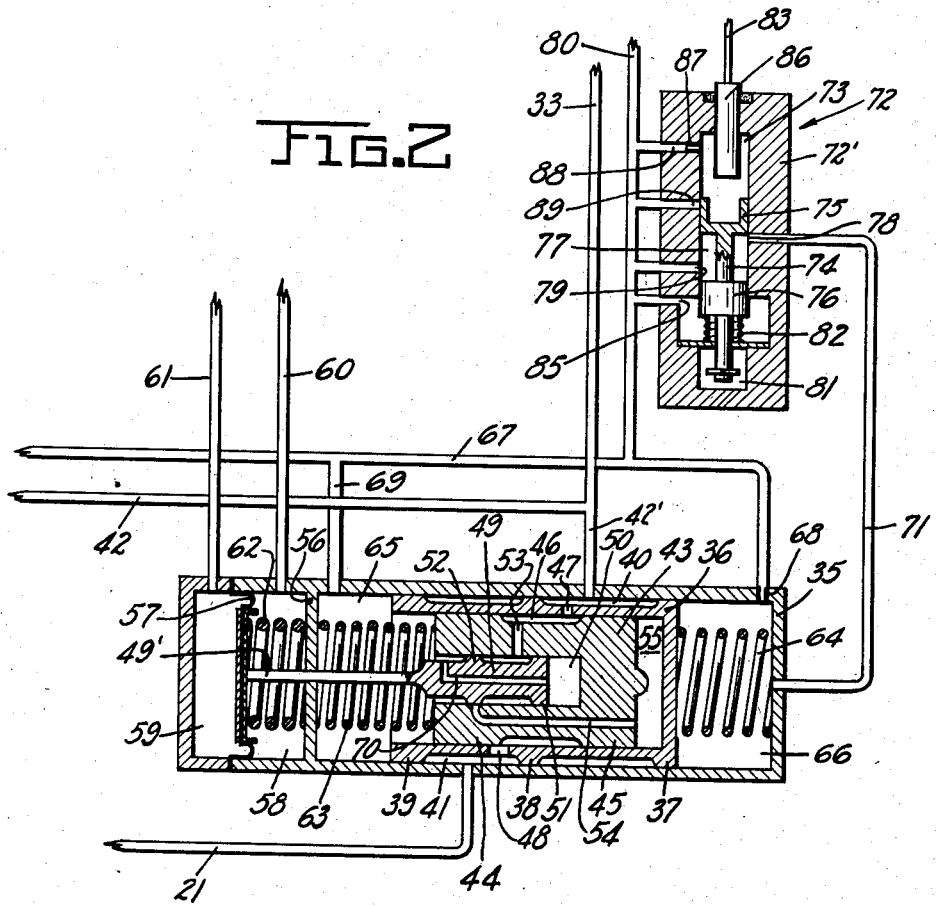
Figure 2 is an enlargement of the regulator valve and acceleration device, with the parts in the positions they occupy when the throttle is opened to accelerate the engine.

If now the pilot should move power lever 25 counterclockwise and open the throttle to a nearly wide open position, bell crank 27 will rotate clockwise and depress plunger or piston 86, whereupon fluid or oil pressure will momentarily build up in chamber 73 and piston valve 74 will move downwardly against the resistance of spring 82 and open port 79 to drain; while at the same time the differential across diaphragm 57 will drop to a point where spring 62 will move pilot valve 49 to the left, venting duct 54 to high pressure oil, which will flow from annular chamber 46 through ducts 53 and 54 to chamber 55 and cause separation of the coupling valve 43 and sleeve 36 and open metering orifice 48, whereupon the parts will assume the positions shown in Figure 2.

Were it not for the acceleration device 72, the rate of opening movement of the coupling valve would depend on the capacity of bleed 68 in conjunction with the relative calibration of springs 64 and 65 and the spring rate of diaphragm spring 62. In general, the coupling valve opening is established by the motion of valve 43 plus the motion of sleeve 36 which latter motion is greater but much slower normally due to the retarding effect of bleed 68. This slow sleeve motion and the small valve motion (due to the stiffness of spring 62) serve to prevent hunting or surging of the oil flow during normal regulation. When a large change in oil flow is required, as when the pilot accelerates the engine, the sleeve cannot move fast enough to deliver the increased flow for adequate engine acceleration while bleed 68 is damping sleeve travel. Under these conditions, the valve 74 moves down and opens by-pass conduit 71 to drain so that there is a substantially instantaneous flow of oil to the coupling, the valve 74 remaining open a length of time as determined by the capacity of bleed 87, which should be calibrated to obtain prompt response by the regulator while at the same time permitting bleed 68 to become effective again in time to avoid excessive surging after the engine has accelerated to the new power selection. It can be seen that conduit 71 by-passes bleed 68 when the pilot's power lever is moved in either direction so that rapid change of oil flow is obtained either in the increase direction to improve engine acceleration, or in the decrease direction to prevent excessive supercharging at a heavily throttled condition and which tends to cause supercharger pulsation (unstable air flow characteristic of superchargers operating at unduly low air flows).

It will be understood that the invention as actually constructed includes refinements not shown in the schematic views of the drawings, and that although only one embodiment of the invention has been illustrated and described, various changes in form and relative arrangements of parts may be made to suit requirements.

I claim:

1. For use with an internal combustion engine having a throttle controlled induction passage provided with a supercharger, a carburetor and a hydraulic coupling for transmitting a driving force to said supercharger at variable ratios of engine-to-supercharger speed; a power control device including a flow regulating or metering valve for regulating the flow of fluid to said coupling, means responsive to the drop across the carburetor for adjusting said valve to different flow regulating positions, and an accelerating device responsive to movement of the throttle for accelerating the initial movement of said valve, said regulating valve being provided with reset means including a bleed and said accelerating device being arranged to temporarily by-pass said bleed.

2. For use with an internal combustion engine having a throttle controlled induction passage provided with a supercharger, a carburetor and a hydraulic coupling for transmitting a driving force to said supercharger at variable ratios of engine-to-supercharger speed; a power control device provided with a flow channel for conducting hydraulic fluid to said coupling, a flow regulator in said channel including a fluid actuated coupling valve and a coupling valve sleeve, the latter slidably coacting with said coupling valve, a pilot valve for regulating flow of power fluid to said coupling valve and sleeve, a diaphragm connected to said pilot valve, means for subjecting said diaphragm to the differential in pressure across said carburetor and whereby said pilot valve and hence said coupling valve and sleeve are rendered responsive to the drop across the carburetor, reset springs for balancing said coupling valve and sleeve at a given flow regulating position, means including a calibrated bleed for determining the rate of movement of said sleeve, a normally closed by-pass connection for by-passing said bleed, and means for opening said by-pass temporarily or momentarily in coordinated relation to throttle opening.

3. A power control device as claimed in claim 2 wherein said means for momentarily opening said by-pass comprises a valve operatively connected to the throttle to be opened upon opening movement of the latter, and means are provided for predetermining the rate of closing movement of said by-pass valve.

4. In a power control system for a supercharged aircraft engine utilizing a fluid coupling for driving a supercharger at varying ratios of engine-to-supercharger speed, means for regulating the flow of hydraulic fluid to the coupling comprising a fluid-actuated metering valve, means automatically operative as a function of charging pressure for opening said valve to increase the metering rate, means operative to reset the valve in a given metering position for a given charge pressure including a calibrated bleed which influences the rate of resetting of the valve, a by-pass connection for by-passing said bleed, and means for momentarily opening said by-pass upon movement of the throttle.

5. A power control system as claimed in claim 4 wherein said means for momentarily opening said by-pass valve comprises a hydraulically operated valve movable to open position against spring pressure and a calibrated bleed is employed to predetermine the rate of movement in a by-pass opening direction of said latter valve.

6. For use with an internal combustion engine having a throttle controlled induction passage provided with a supercharger and a hydraulic coupling for transmitting a driving force to said supercharger at variable ratios of engine-to-supercharger speed, a power control device including a flow regulating or metering valve for regulating the flow of fluid to said coupling, said valve having a hydraulically operated member movable to different positions to vary the rate of fluid flow, means responsive to changes in pressure in said induction passage for controlling the application of hydraulic pressure to said member, and means responsive to movement of the throttle for momentarily increasing the effectiveness of the hydraulic operating pressure when said member is initially moved to thereby accelerate the rate of travel of said member.

JAMES MIDDLETON EASTMAN.

References Cited in the file of this patent

UNITED STATES PATENTS

| Number | Name | Date |
|---|---|---|
| 2,223,715 | Berger | Dec. 3, 1940 |
| 2,283,644 | Nallinger | May 19, 1942 |